United States Patent
Vanderveen

(10) Patent No.: US 9,119,182 B2
(45) Date of Patent: Aug. 25, 2015

(54) METHODS AND APPARATUS FOR EXPRESSION USE DURING D2D COMMUNICATIONS IN A LTE BASED WWAN

(71) Applicant: QUALCOMM Incorporated, San Diego, CA (US)

(72) Inventor: Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 13/656,427

(22) Filed: Oct. 19, 2012

(65) Prior Publication Data

US 2014/0112258 A1   Apr. 24, 2014

(51) Int. Cl.
H04W 72/04   (2009.01)
H04W 76/02   (2009.01)
H04W 8/18   (2009.01)

(52) U.S. Cl.
CPC .............. *H04W 76/023* (2013.01); *H04W 8/18* (2013.01)

(58) Field of Classification Search
CPC .................................................. H04W 76/023
USPC ........................ 370/329, 328; 455/433, 435.1
See application file for complete search history.

(56) References Cited

U.S. PATENT DOCUMENTS

| | | | |
|---|---|---|---|
| 7,454,464 B2 | 11/2008 | Puthenkulam et al. | |
| 7,650,159 B2 | 1/2010 | Poikselka | |
| 8,019,334 B2 | 9/2011 | Koskela et al. | |
| 8,548,467 B2 * | 10/2013 | Vanderveen et al. | 455/435.1 |
| 8,588,102 B2 * | 11/2013 | Hoshino et al. | 370/252 |
| 9,042,550 B2 * | 5/2015 | Wang et al. | 380/270 |
| 2005/0193106 A1 | 9/2005 | Desai et al. | |
| 2008/0108437 A1 | 5/2008 | Kaarela et al. | |
| 2009/0170426 A1 | 7/2009 | Jung et al. | |
| 2010/0118790 A1 * | 5/2010 | Guo et al. | 370/328 |

(Continued)

FOREIGN PATENT DOCUMENTS

| | | | | |
|---|---|---|---|---|
| WO | WO-2011039719 A1 | | 4/2011 | |
| WO | WO2011039719 A1 * | | 4/2011 | H04L 29/06 |
| WO | WO2012118448 | * | 9/2012 | H04W 40/00 |
| WO | WO-2012118448 A1 | | 9/2012 | |

OTHER PUBLICATIONS

S2-086319;3GPP TSG-SA2 Meeting #67;Sophia Antipolis, France, Aug. 25-29, 2008.*

(Continued)

*Primary Examiner* — Parth Patel
(74) *Attorney, Agent, or Firm* — James K. O'Hare

(57) ABSTRACT

A method, an apparatus, and a computer program product for wireless communication are provided in connection with use of expressions with D2D communications in a LTE based WWAN. In one example, a MME is equipped to receive a request from a first UE to establish a communication link with a second UE based on a first expression pair, determine whether the UEs can use a first context associated with previously used expression pair, and provide information associated with the first context to the first UE. In another example, a UE is equipped to send a connection request, to its MME, to establish a communication link with a second UE based on a first expression pair, receive at least a portion of information associated with a first context between the UEs based on a previously used expression pair, and establish the communication link with the second UE using the received information.

96 Claims, 13 Drawing Sheets

(56) References Cited

U.S. PATENT DOCUMENTS

| | | |
|---|---|---|
| 2011/0039592 A1 | 2/2011 | Haddad et al. |
| 2011/0098043 A1* | 4/2011 | Yu et al. .................... 455/435.1 |
| 2011/0294508 A1 | 12/2011 | Min et al. |
| 2012/0117400 A1 | 5/2012 | Vandwalle et al. |
| 2012/0163235 A1 | 6/2012 | Ho et al. |

OTHER PUBLICATIONS

International Search Report and Written Opinion—PCT/US2013/065718—ISA/EPO—Mar. 24, 2014.

Corson M.S., et al., "Toward Proximity-Aware Internetworking," IEEE Wireless Communications, IEEE Service Center, Dec. 1, 2010, vol. 17 (6), pp. 26-33, XP011340670.

Doppler K., et al., "Device-to-Device Communication as an Underlay to LTE-Advanced Networks", IEEE Communications Magazine, Dec. 2009, vol. 47 (12), pp. 42-49.

Ericsson: "Elaboration of Flow Details in Procedure S1-Based Handover," 3GPP Draft; S2-086319, SA WG2, Sophia Antipolis, France, Aug. 29, 2008, pp. 8, XP050628977.

* cited by examiner

METHODS AND APPARATUS FOR EXPRESSION USE DURING D2D COMMUNICATIONS IN A LTE BASED WWAN

BACKGROUND

1. Field

The present disclosure relates generally to communication systems, and more particularly, to a use of expressions with device to device (D2D) communications in a Long Term Evolution (LTE) based wireless wide area network (WWAN).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

Currently, many devices may be operable in a cellular network. When a first device detects an expression (e.g., network-layer discovery identifier) of interest that is announced by another device, the first device may attempt to communicate directly with the device that announcing that expression. Currently, to establish a D2D communication link between the devices, serving mobility management entities (MMEs) negotiate a D2D context that may include at least a link security context (i.e. key and expiration), and possibly other link-layer parameters (e.g., quality of service (QoS), etc.). The D2D context is established to support communication at the application-layer (app-layer) for the pair of expressions. Since the devices may have multiple expressions to announce, it is possible that the same two devices might attempt to communicate due to discovery of a different expression, and each discovered expression normally requires a separate D2D context to be formed. Additionally, a device may have multiple expressions to announce at different times. This process can be assisted by the network. No functionality exists within the WWAN that allows the device and/or network to associate parameters with each announced expression, in order to provide different types of services/user experiences, control the type of expression authentication and link security protocols, allow expressions to be associated with UE identities, etc.

As the demand for D2D communication increases, there exists a need for methods/apparatuses for supporting D2D communications within LTE while minimizing use of WWAN resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with use of expressions with D2D communications in a LTE based WWAN. In one example, a MME is equipped to receive a request from a first UE to establish a communication link with a second UE based on a first expression pair, determine whether the first UE and the second UE can use a first context associated with a previously established communication link based on a previously used expression pair, and provide at least a portion of information associated with the first context to the first UE upon a determination that the first UE and the second UE have the first context. In another example, a UE is equipped to send a connection request to its MME, to establish a communication link with a second UE based on a first expression pair, receive at least a portion of information associated with a first context between the first UE and the second UE based on a previously used expression pair, and establish the communication link with the second UE using the received information.

According to related aspects, a method for use of expressions with D2D communications in a LTE based WWAN is provided. The method can include receiving, by a MME, a request from a first UE to establish a communication link with a second UE based on a first expression pair. Further, the method can include determining whether the first UE and the second UE can use a first context associated with a previously established communication link based on a previously used expression pair. Moreover, the method may include providing at least a portion of information associated with the first context to the first UE upon a determination that the first UE and the second UE have the first context.

Another aspect relates to a communications apparatus configured to use expressions with D2D communications in a LTE based WWAN. The communications apparatus can include means for receiving, by a MME, a request from a first UE to establish a communication link with a second UE based on a first expression pair. Further, the communications apparatus can include means for determining whether the first UE and the second UE can use a first context associated with a previously established communication link based on a previously used expression pair. Moreover, the communications apparatus can include means for providing at least a portion of information associated with the first context to the first UE upon a determination that the first UE and the second UE have the first context.

Another aspect relates to a communications apparatus. The apparatus can include a processing system configured to receive, by a MME, a request from a first UE to establish a communication link with a second UE based on a first expression pair. Further, the processing system may be configured to determine whether the first UE and the second UE can use a first context associated with a previously established communication link based on a previously used expression pair. Moreover, the processing system may further be configured to provide at least a portion of information associated with the first context to the first UE upon a determination that the first UE and the second UE have the first context.

Still another aspect relates to a computer program product, which can have a computer-readable medium including code for receiving, by a MME, a request from a first UE to establish a communication link with a second UE based on a first expression pair. Further, the computer-readable medium can include code for determining whether the first UE and the second UE can use a first context associated with a previously established communication link based on a previously used expression pair. Moreover, the computer-readable medium can include code for providing at least a portion of information associated with the first context to the first UE upon a determination that the first UE and the second UE have the first context.

According to related aspects, a method for use of expressions with D2D communications in a LTE based WWAN is provided. The method can include sending a connection request, to a MME, to establish a communication link between a first UE and a second UE based on a first expression pair. Further, the method can include receiving at least a portion of information associated with a first context between the first UE and the second UE based on a previously established communication link with a previously used expression pair. Moreover, the method may include establishing, by the first UE, the communication link with the second UE using the received at least a portion of the information.

Another aspect relates to a wireless communications apparatus enabled for use of expressions with D2D communications in a LTE based WWAN. The wireless communications apparatus can include means for sending a connection request, to a MME, to establish a communication link between a first UE and a second UE based on a first expression pair. Further, the wireless communications apparatus can include means for receiving at least a portion of information associated with a first context between the first UE and the second UE based on a previously established communication link with a previously used expression pair. Moreover, the wireless communications apparatus can include means for establishing, by the first UE, the communication link with the second UE using the received at least a portion of the information.

Another aspect relates to a wireless communications apparatus. The apparatus can include a processing system configured to send a connection request to a MME to establish a communication link between a first UE and a second UE based on a first expression pair. Further, the processing system may be configured to receive at least a portion of information associated with a first context between the first UE and the second UE based on a previously established communication link with a previously used expression pair. Moreover, the processing system may further be configured to establish, by the first UE, the communication link with the second UE using the received at least a portion of the information.

Still another aspect relates to a computer program product, which can have a computer-readable medium including code for sending a connection request, to a MME, to establish a communication link between a first UE and a second UE based on a first expression pair. Further, the computer-readable medium can include code for receiving at least a portion of information associated with a first context between the first UE and the second UE based on a previously established communication link with a previously used expression pair. Moreover, the computer-readable medium can include code for establishing, by the first UE, the communication link with the second UE using the received at least a portion of the information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
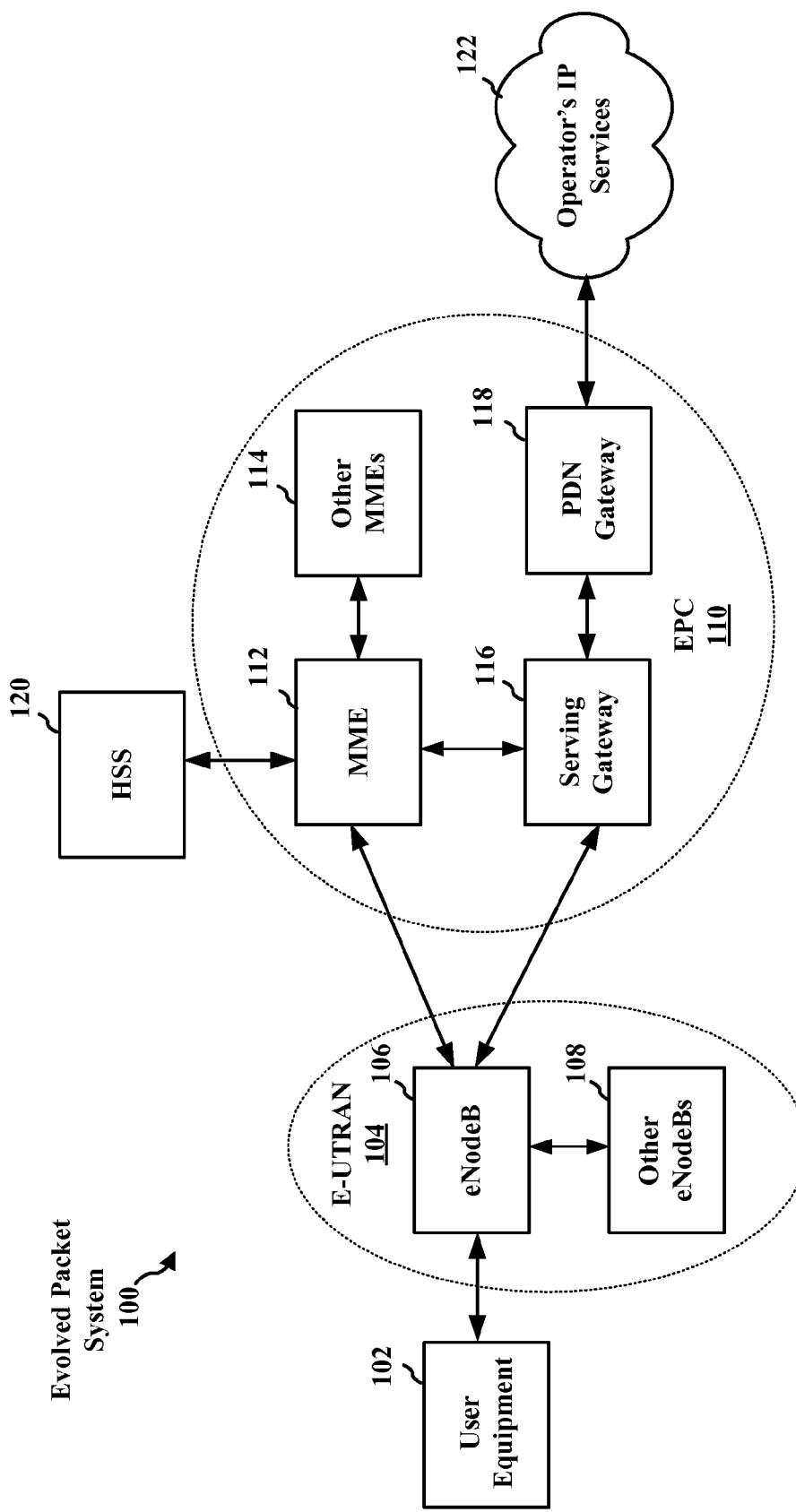
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
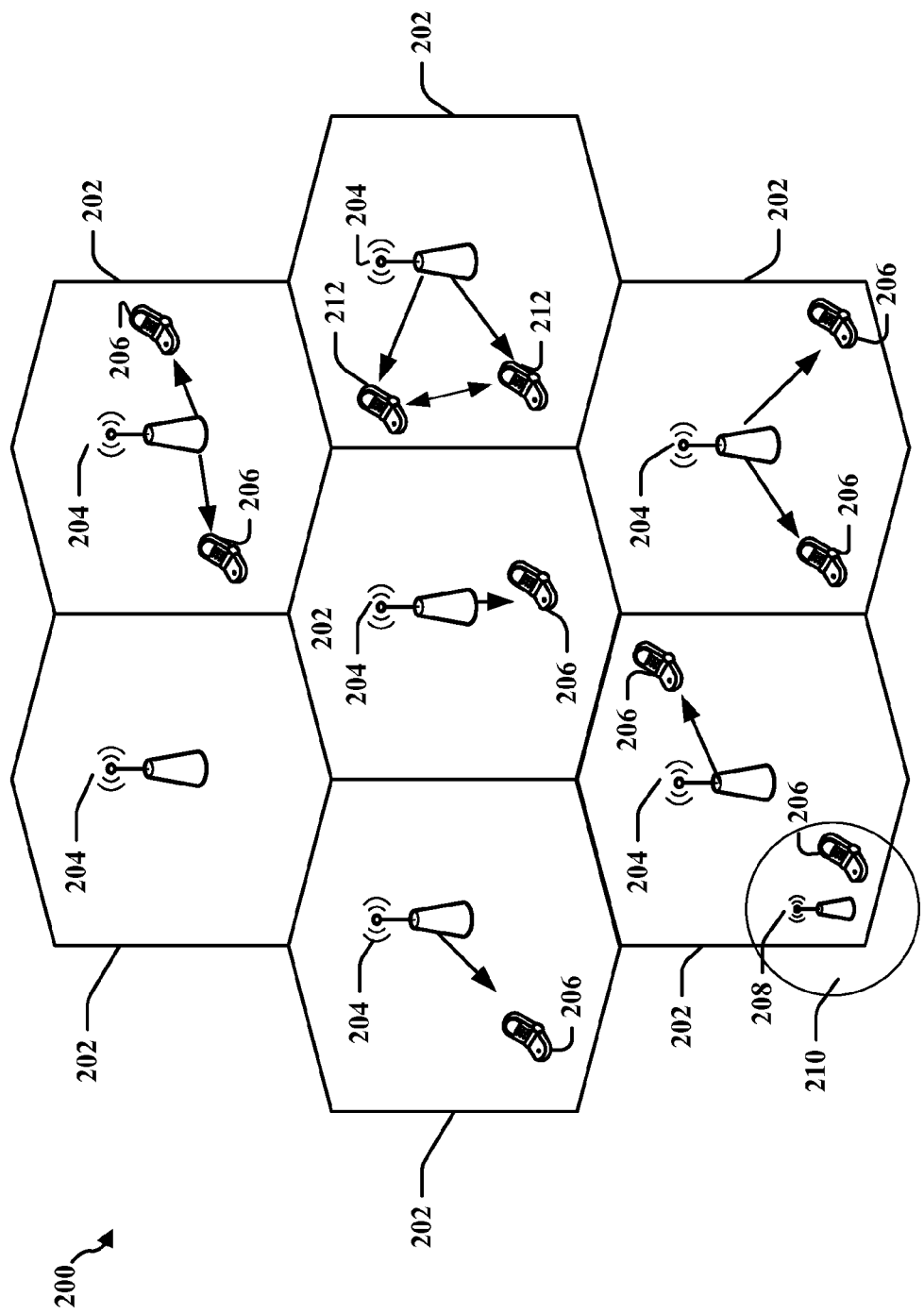
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
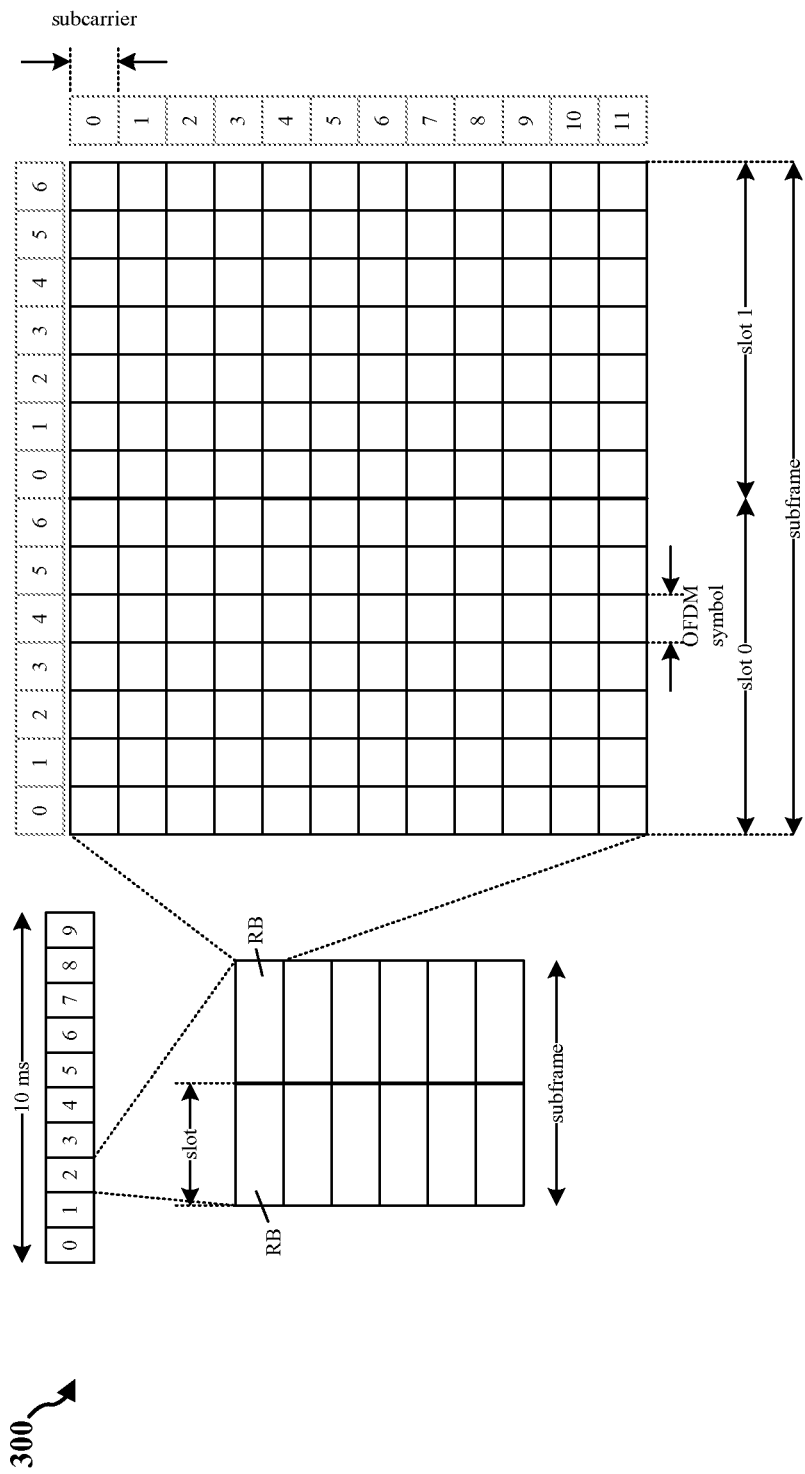
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
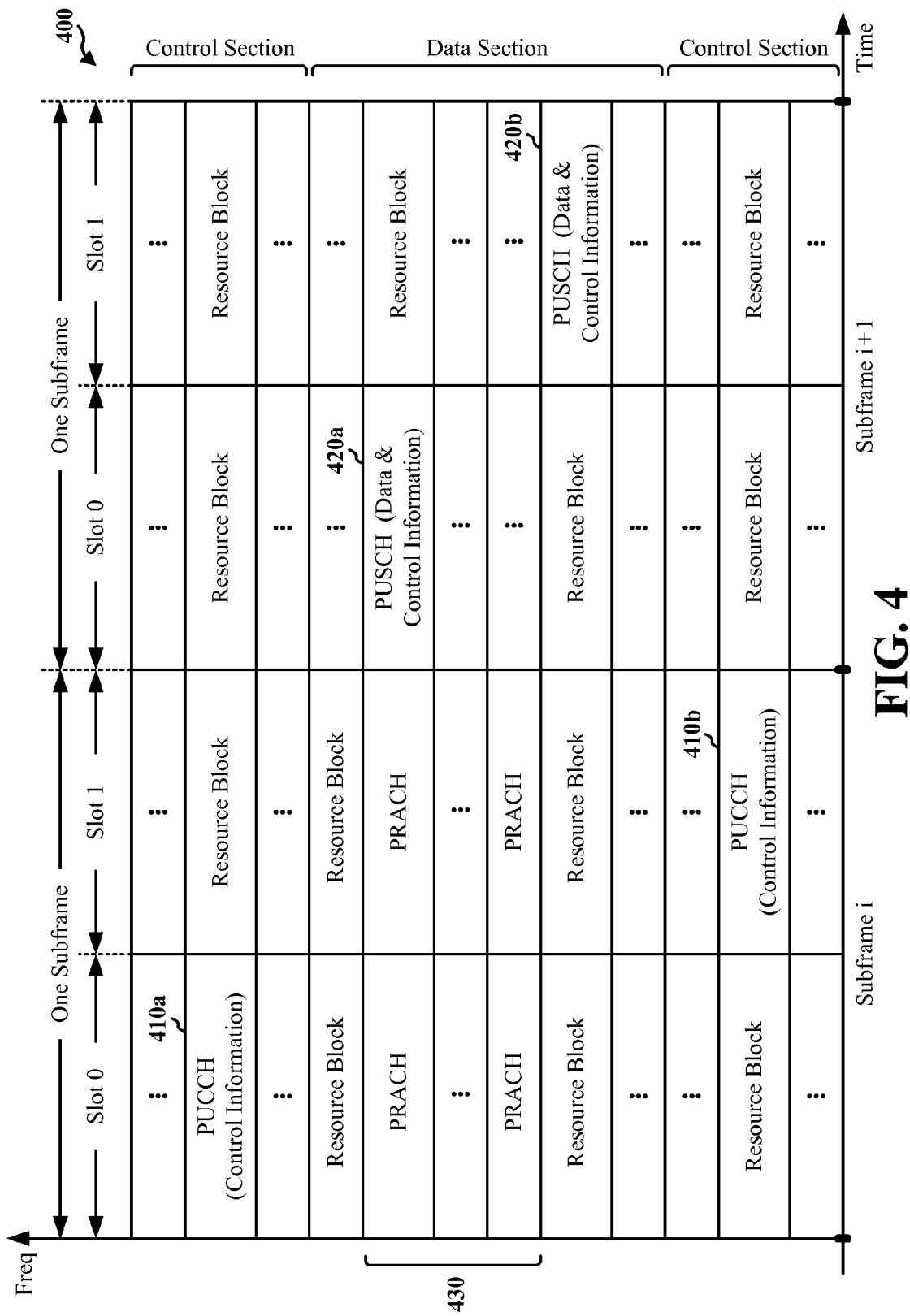
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
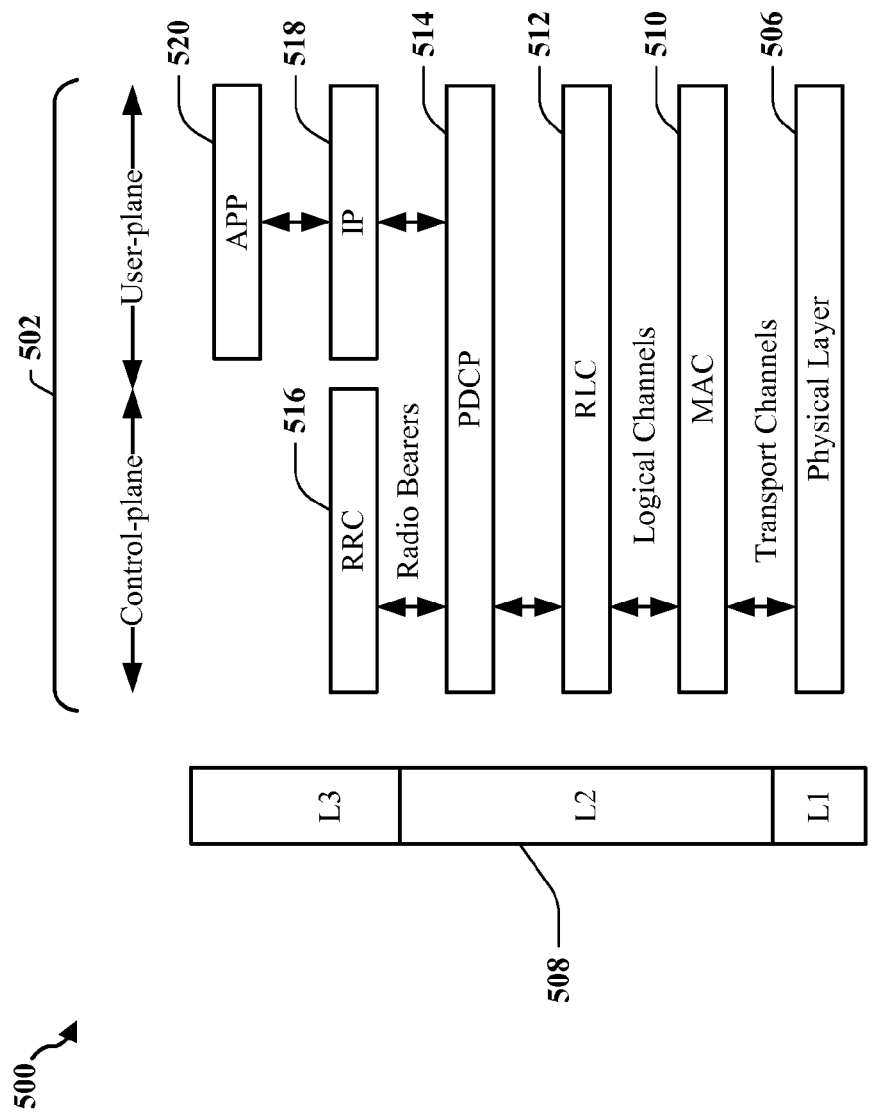
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the eNB is shown with three layers: Layer 1, Layer 2, and Layer 3. Communication 522 of data/signaling may occur between UE 502 and eNB 502 across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE 502. The user plane also includes an internet protocol (IP) sublayer 518 and an application sublayer 520. The IP sublayer 518 and application sublayer 520 are responsible for supporting communication of application data between the eNB 504 and the UE 502.

Figure 6:
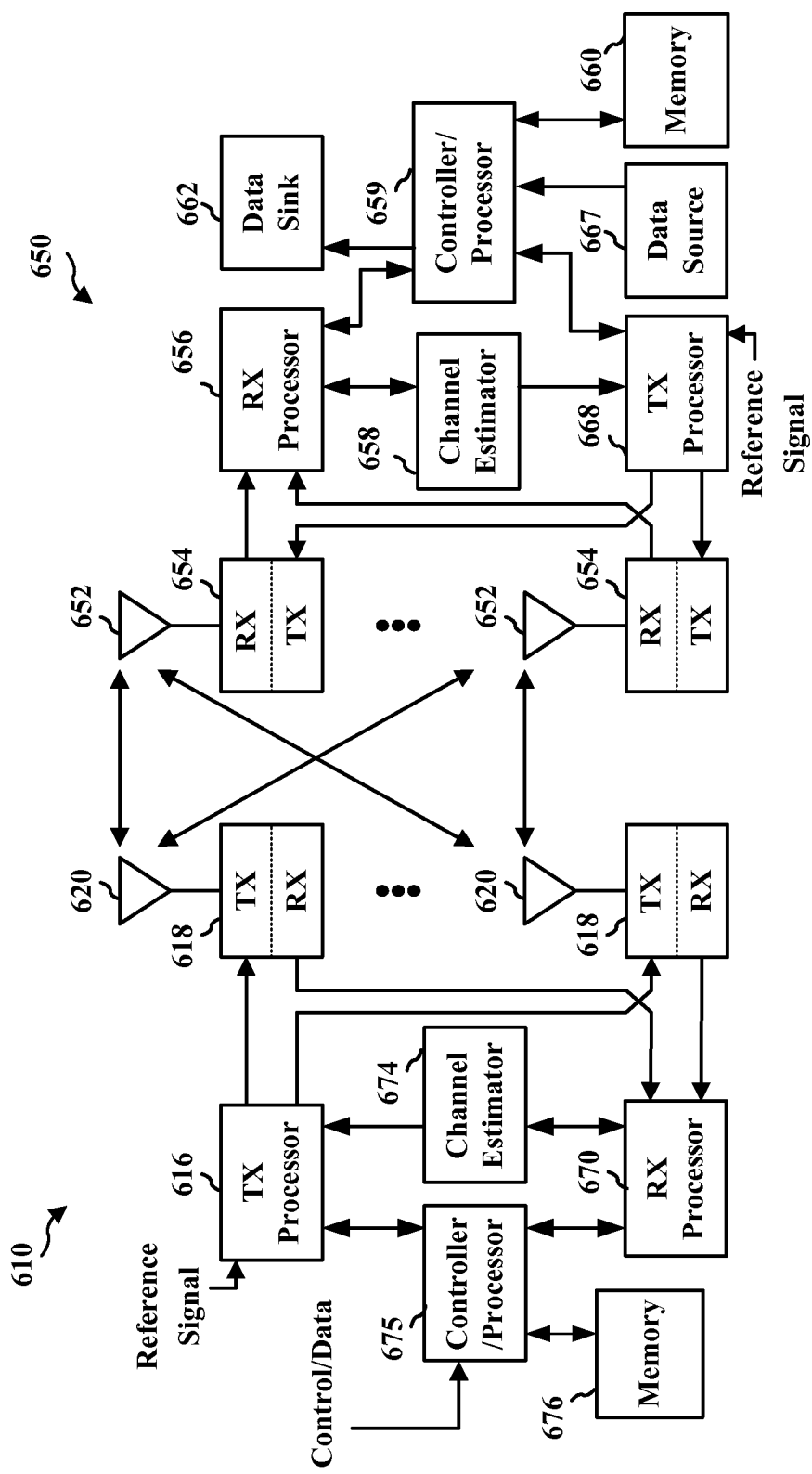
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
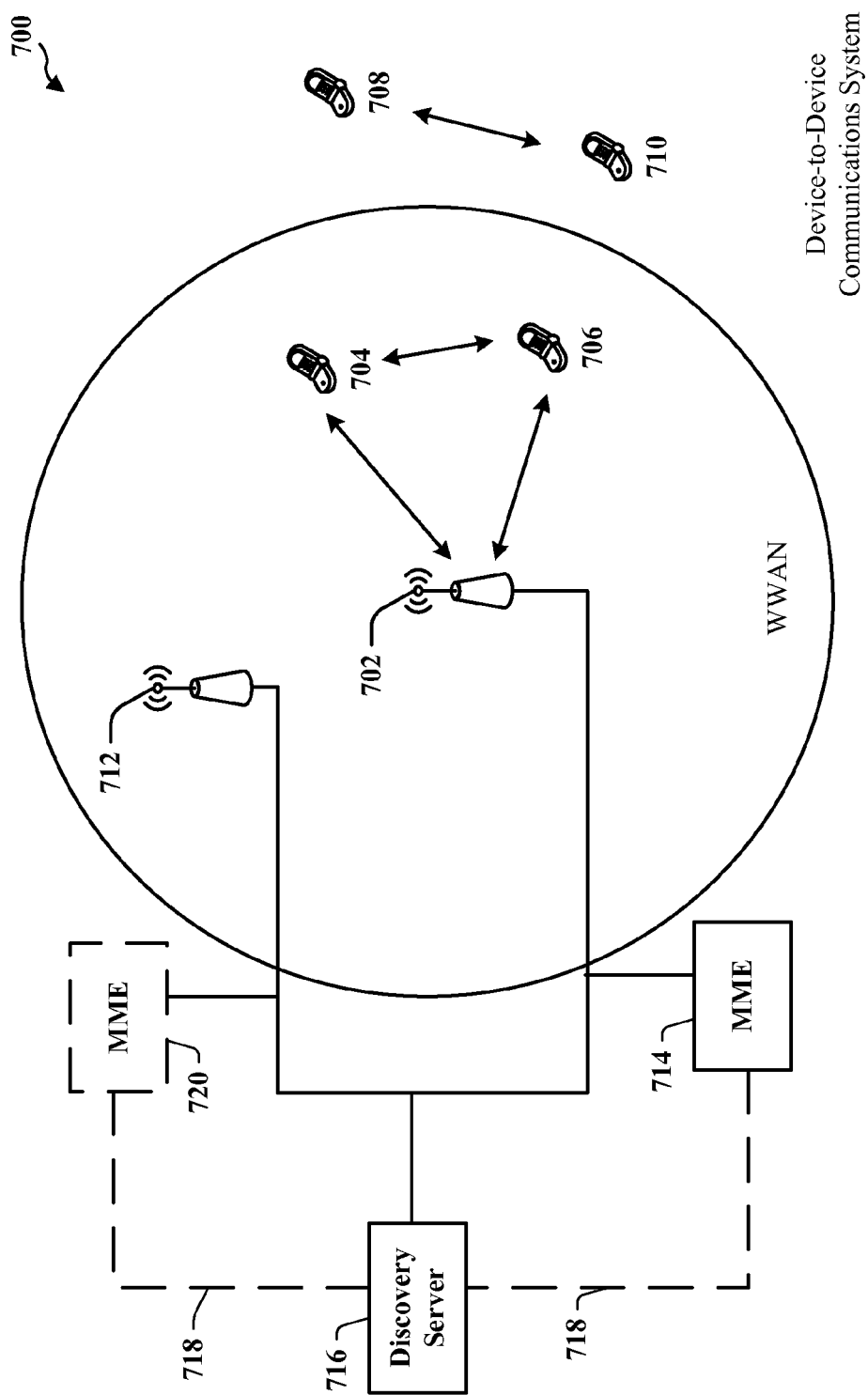
FIG. 7 is a diagram illustrating a device-to-device communications network.

FIG. 7 is a diagram of a device-to-device communications system 700. The device-to-device communications system 700 includes a plurality of wireless devices 704, 706, 708, 710, one or more base stations (eNodeBs 702, 712) and one or more MMEs (714, 720). In an optional aspect, communications system 700 may also include discovery server 716 operable to communicate 718 with the MME(s) (714, 720). In such an optional aspect, as depicted in FIG. 7, discovery server 716 may be separate from either MME 714 and/or MME 720. In another aspect, discovery server 716 may be associated with and/or included within MME 714 and/or MMR 720.

The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with base station 702 and/or base station 712, and some may do both. In another aspect, the WWAN may include multiple base stations (702, 712) that may provide a coordinated communications environment through connectivity provided via one or more network entities (e.g., MMEs 714, 720, discovery server 716).

For example, as shown in FIG. 7, the wireless devices 708, 710 are in device-to-device communication and the wireless devices 704, 706 are in device-to-device communication. The wireless devices 704, 706 are also communicating with the base station 702.

In an operational aspect, device 704, which might itself announce its own expression(s), may monitor for multiple expressions at a time (e.g., one's friends on a social networking service). Further, regardless of the discovery mechanism (e.g., direct discovery, network-assisted discovery, etc.) an expression match may be performed based on the value of the expression(s) found, and not a UE identity. For example, a first device 704 may have a social networking expression (Expr-A), which it announces periodically. Contemporaneously, device 704 may also be monitoring (directly or via eNodeB 702, MME 714) for expressions from another device 706 (e.g., Expr-B, Expr-C, and/or Expr-D). This monitoring task may be application-triggered rather than device-triggered. In other words, although other applications may be aware that Expr-A is looking for Expr-B and Expr-C, the applications may be unaware that the Expr-B and Expr-C are announced by the same device (e.g., device 706). When device 704 detects an expression (e.g., Expr-B) announced by the other device 706, and device 704 and device 706 have not communicated before (or if they have, they do not have any local state for this any longer), the network (e.g., MME 714) may assist device 704 and device 706 in setting up a security context and other link parameters (e.g., a device to device context or "D2D context") for the (Expr-A, Expr-B) expression pair. Still further, when device 704 detects another expression that is associated with device 706 (e.g., Expr-C), the devices (704, 706) may establish another D2D context to support communications based on newly detected expression pair (Expr-A, Expr-C). In another aspect, device 704 could have other expression(s) (e.g. Expr-X), which may be used by an application looking for Expr-D associated with to device 706. In such an aspect, yet another context may be sought for the (Expr-X, Expr-D) context. In another aspect, ordering within the expression pair (discoverer, discoveree) may or may not be a relevant term for a D2D context. In other words, the D2D context may be bi-directional, where ordering is not relevant, or unidirectional, where ordering may be relevant.

Although each device may not be aware that the newly requested expression pair is associated with the same device pair (704, 706), MME 714 and/or MME 720 may be configured to store the D2D contexts for each of its served devices. MME 714 may store valid D2D contexts associated with device 704 (indexed, for example, by the identifier of the other device(s)), along with announced expressions for device 704. In such an aspect, where MME 714 determines that the requested expression pair belongs to the same peer devices, the same D2D context can be reused. In another aspect, even if the QoS characteristics are different for different expression pairs, other D2D context may be reused, such as but not limited to, link security context, Master Key information, etc. Further, MME 714 may be configured to provide stored D2D context information to MME 720 that may serve device 704.

In another operational aspect, device 704, employing proximity services, may use expressions to announce its presence and/or monitor for the presence of others. Each expression may represent (e.g., be a mapping of) a particular identity, application, piece of information/query, interest, etc. A device 704 might have multiple expressions to announce on the LTE spectrum allocated for direct discovery using a WAN-assisted discovery processes. Each expression may be unique for a device and locality. Parameters may be associated with various expressions to provide additional functionality/flexibility associated with expression distribution. In an aspect, these parameters may be stored in a discovery server database 716. In another aspect, the parameters may be set by a network operator entity (e.g. HSS proxy), or may be obtained from a device 702 as a request. Further, changes to these parameters can be made by the network or the UE. By way of example and not limitation, a list of parameters that may be associated with an expression is provided in Table 1. Further, as seen in Table 1, a brief description of each example parameter is provided along with an example use and an example entity that may modify the parameters. The description provided in Table 1 is for clarification and does not limit the scope of parameters that may be associated with an expression.

TABLE 1

Parameters for association with an expression

| Expression Parameter | Possible values | Use | Set by |
|---|---|---|---|
| Range of announcement | Short (e.g. 50 m), long (e.g. 500 m), cell-wide (throughout sector/cell), extended (current cell + neighbor cells), etc. | Allow applications to control range of discovery. Allow network to dynamically change the range to cope with density increases | User (as allowed by subscriber profile). Network (under some circumstances) |
| Type of expression authentication provided for this expression | None, certificate-based (e.g., some public expressions can be listed in an operator-given subscription certificate) | Allows peer UEs to know whether the discovered expression should be verified to have been assigned to this UE. (Verification only during link establishment) | Network |
| Type of link security supported (for links established due to this expression.) | Network-assisted symmetric key, operator-provided cert, self-signed cert. Can be some or all of the above. | Allows peer UEs to know what type of link security they can establish with this UE for this expression. | Network |
| Associated UE identity | None, Phone number, SIP/RCS URI, E-164 number, S-TMSI, GUTI. | Allows peer applications to associate multiple expressions with a peer identity | User or Network |
| Periodicity of announcement (for broadcasted expressions) | Few seconds to minutes | Allows network to manage congestion on discovery channel | Network and User |

In an aspect in which parameters are associated with an expression, distribution of the expression may be defined through one or more of the parameter values. In an example in which a range parameter is associated with expressions for a device 704, a user may set a social media identity expression parameter to have a "long range", while setting an anonymous gaming expression parameter to have a short range. This may because the user may be interested in friends discovering the expression throughout a macro cell, while for gaming the user may wish to play a game with people within a visible range of the user.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 8:
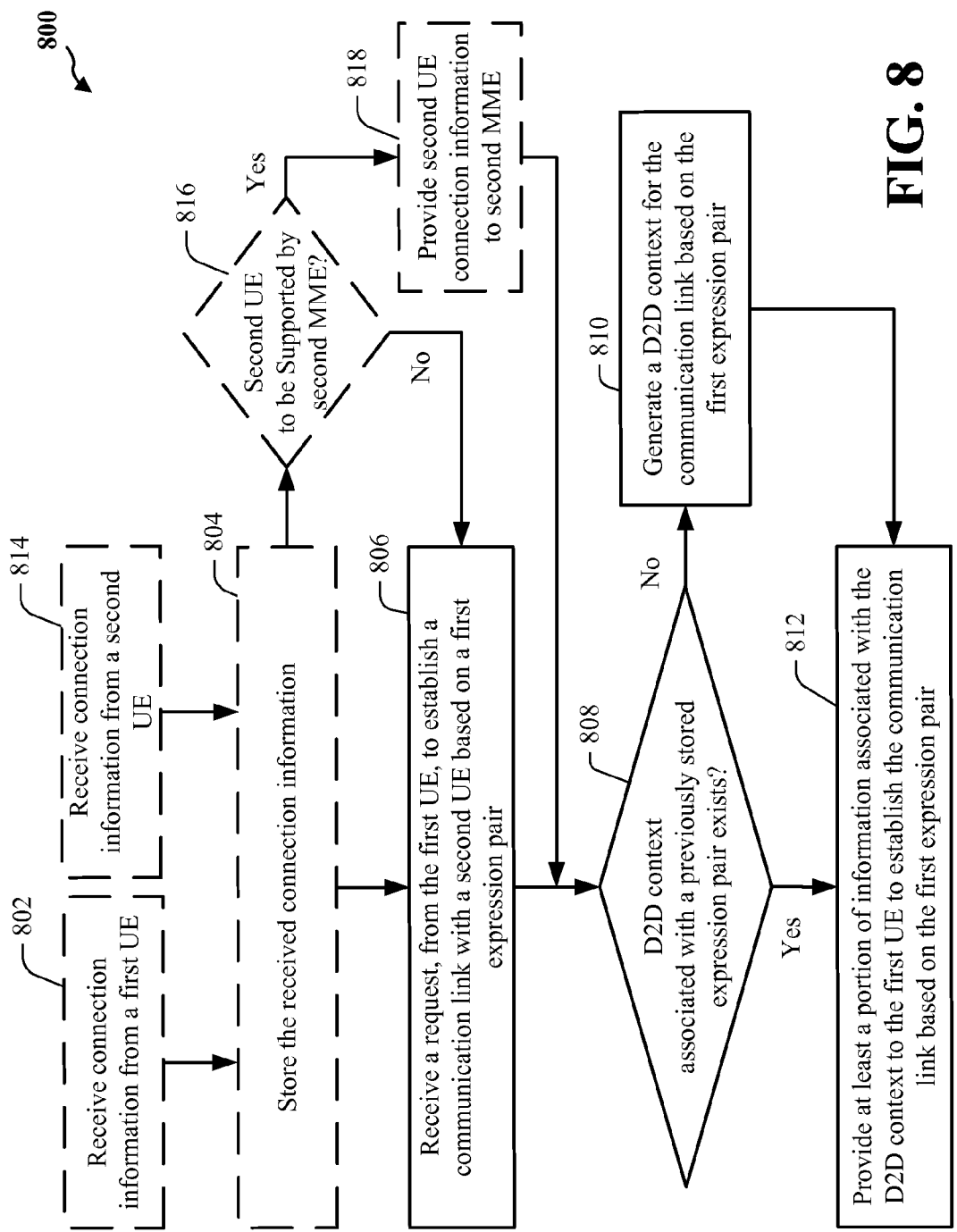
FIG. 8 is a flow chart of a first method of wireless communication.
Figure 11:
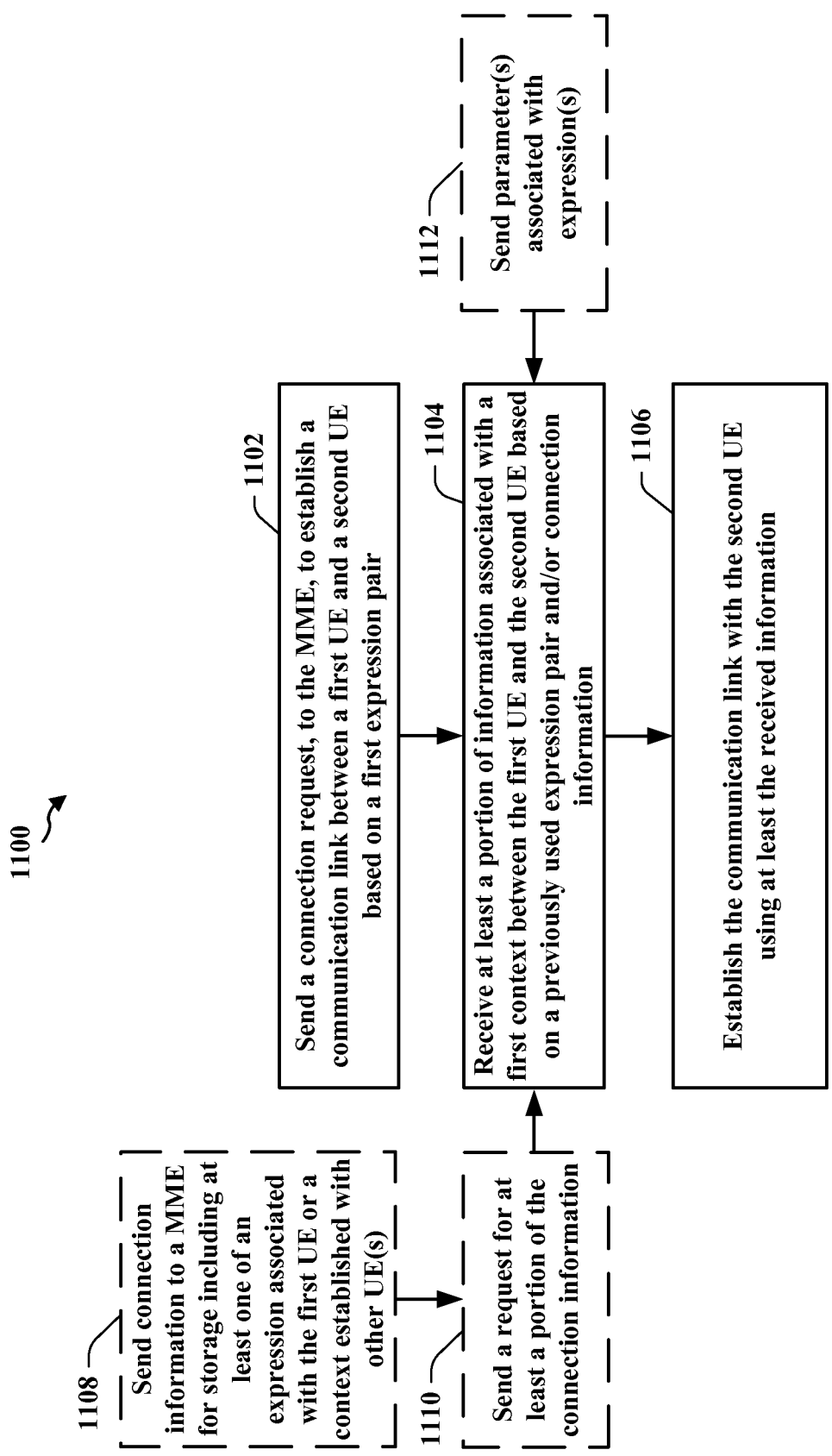
FIG. 11 is a flow chart of a second method of wireless communication.

FIGS. 8 and 11 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 is a flow chart 800 of a first method of wireless communication. The method may be performed by a WAN entity (e.g., an MME, eNodeB, discovery server, home subscriber server (HSS) proxy, etc.).

In an optional aspect, at block 802, a WAN entity may receive connection information including one or more expressions associated with a first UE and any D2D context information associated with a previously established expression pair communication link. As used herein, an expression pair may include a discovered expression of a second UE and an expression of the first UE. In an aspect, the MME may interact with a MME supporting the second UE. In such an aspect, the D2D context may be negotiated together between the MMEs, or one MME may set up the D2D context and send it to the other MME. In still another aspect, a database may be available to multiple MMEs within which UE announced expressions and/or parameters may be stored. In such an aspect, the expressions may be stored with a current global unique temporary identifier (GUTI) (a cellular ID that identifies a current serving MME). In another aspect, the D2D context may include, but is not limited to, cryptographic material such as a "master key", link parameters such as quality of service (QoS) allowed, other link configuration parameters, etc. In another aspect, the WAN entity may receive and/or associate one or more parameters with each of the received expressions from the first UE. By way of example and not limitation, example parameters, parameter values, a brief description of the parameter use and a suggested entity that may update the parameter values is provided in Table 1.

In an optional aspect, at block 804, the WAN entity may store the received connection information (e.g., D2D context, expression, parameters). In an aspect, the D2D context information may be stored at the MME with an indexing based on a UE identifier of a UE with which the first UE has previously communicated. In other words, the MME may store valid D2D contexts for the first UE (indexed, for example, by the identifier of the other UE(s)), along with all the announced expression for the first UE. When the MME stores the D2D contexts, if one of the UEs loses state/context, it can ask its MME for the context. In another aspect, the D2D context may have a time to live (TTL) associated with it, regardless of where it is stored (e.g., UE, MME, network entity, etc.). This TTL may be determined by the MME(s).

At block 806, the WAN entity may receive a request from the first UE to establish a communication link based on a first expression pair with a second UE.

At block 808, the WAN entity may determine whether a D2D context exists that has supported communications between the UEs based on a previously used expression pair. In such an aspect, the D2D context may have been already used for this new expression pair, or may have been used for a previously used expression pair. In another aspect, a discovery server may obtain an indication that the second UE is monitoring for an expression available from the first UE, and may match the indication from the second UE with the expression from the first UE. In an aspect where the discovery is network-based, the discovery server may limit which expressions are available for discovery based on one or more of the values of the parameters. For example, where a parameter indicates that the expression is for a specified locality, then even though a second UE is monitoring for the expression, if the second UE is not within the locality (e.g. a range away from the first UE), then the discovery server does not allow the expression to be discovered by the second UE.

If at block 808, the WAN entity may determine that the UEs have no known existing D2D context information, then at block 810, the WAN entity may generate a D2D context to support communications based on the first expression pair, and at block 812, the WAN entity may provide at least a portion of the generated D2D context information to the first UE.

By contrast, if at block 808, the MME determines that the UEs have previously used D2D context information, then at block 812, the MME may provide the UE with D2D context information that was previously generated.

In an optional aspect, at block 814, WAN entity may also receive connection information from the second UE. In such an aspect, the connection information may include one or more expressions, previously established D2D contexts, parameters, etc.

Further, in another optional aspect, at block 816, where the WAN entity determines that a UE is being handed off to a new MME, at block 818, the MME may provide the D2D context information and expression information associated with that UE to the new MME. Thereafter, the process may return to block 808.

Figure 9:
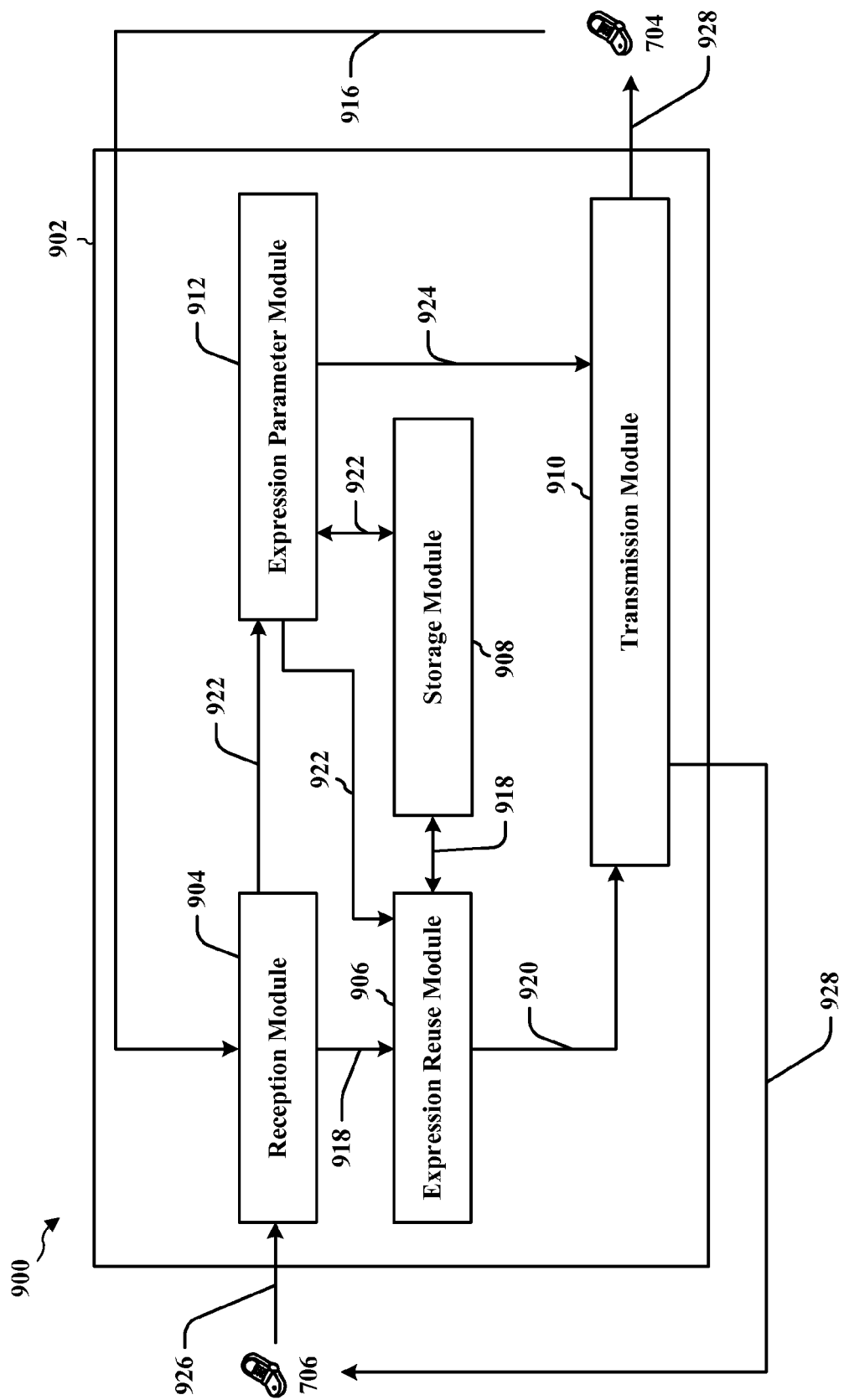
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a WAN entity (e.g., MME, eNodeB, discovery server, etc).

The apparatus 902 includes a reception module 904 that may receive a request 916 from a first UE 704 to establish a communication link with a second UE 706 based on a first expression pair. In an aspect, the expression pair may be associated with connection information 918. In an aspect, the first expression pair may be associated with a service layer, and the first context may be associated with a link layer. In another aspect, expressions associated with the first UE may be associated with the first context used by the first UE and second UE and may be stored in storage module 908. In an aspect, the first context may include information to facilitate communications between the first UE 704 and the second UE 706. For example, the context may include cryptographic material, a quality of service (QoS) parameter, link configuration parameters, etc. In such an aspect, the configuration parameters may be associated with a variety of available communication protocols (e.g., WAN, WiFi, Bluetooth, etc.). In another aspect, reception module 904 may receive connection information 926 from the second UE 706. In such an aspect, the connection information 918 may include an expression associated with the second UE 706, a context established with other UEs, parameters 922 associated with any of the expressions, etc. Further, in such an aspect, the connection information 918 may be stored in storage module 908. In another aspect, reception module 904 may receive parameters 922 associated with various expressions.

Apparatus 902 may further include expression reuse module 906 and storage module 908. In an aspect, connection information 918 stored in storage module 908 may be indexed based on an identifier associated with each of the UEs (704, 706). In an aspect, a time to live (TTL) value may be applied to connection information 918 and/or parameters 922 stored in storage module 908, such that the connection information 918 and/or parameters 922 may be removed from storage module 908 at the expiration of the TTL value. Expression reuse module 906 may determine whether the first UE 704 and the second UE 706 can use a first context associated with a previously established communication link based on previous connection information 918. In an aspect, expression reuse module 906 may provide at least a portion of information 920 associated with the first context to the first UE 704 upon a determination that the first UE 704 and the second UE 706 have the first context. Additionally or in the alternative, expression reuse module 906 may generate a second context for the communication link based on the first expression pair upon a determination that the first UE 704 and the second UE 706 do not have the first context, and may provide at least a portion of information 920 associated with the second context to the first UE 704 to establish the communication link based on the first expression pair 916. In such an aspect, the generated context may be stored in storage module 908. In an aspect, expression reuse module 906 may search storage module 908 for one or more contexts associated with the first UE 704 for a context that references an expression associated with the second UE 706. In another aspect, expression reuse module 906 may be configured to retrieve requested connection information 918 from storage module 908. For example, a UE 706 may request connection information and expression reuse module 906 may provide the requested connection information 920 through a message 928 using transmission module 910. In still another aspect, apparatus 902 may determine that a UE (e.g., 704,706) served by apparatus 902 is to be handed off to receive service from another MME. In such an aspect, expression reuse module 906 may obtain connection information 918 from storage module 908 and provide such information to the other MME.

Apparatus 902 may include expression parameter module 912 that may assist expression reuse module 906 by providing parameter information 922 associated with an expression. Expression reuse module 906 may include a portion of the parameter 922 with D2D context information 920 provided in a message 928 using transmission module 910. In another aspect, expression parameter module 912 may indicate whether an expression is discoverable based on the parameters 922 associated with the expression. Examples of parameters are provided with reference to Table 1 above.

The apparatus may include additional modules that perform each of the steps of the algorithm in the aforementioned flow charts of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
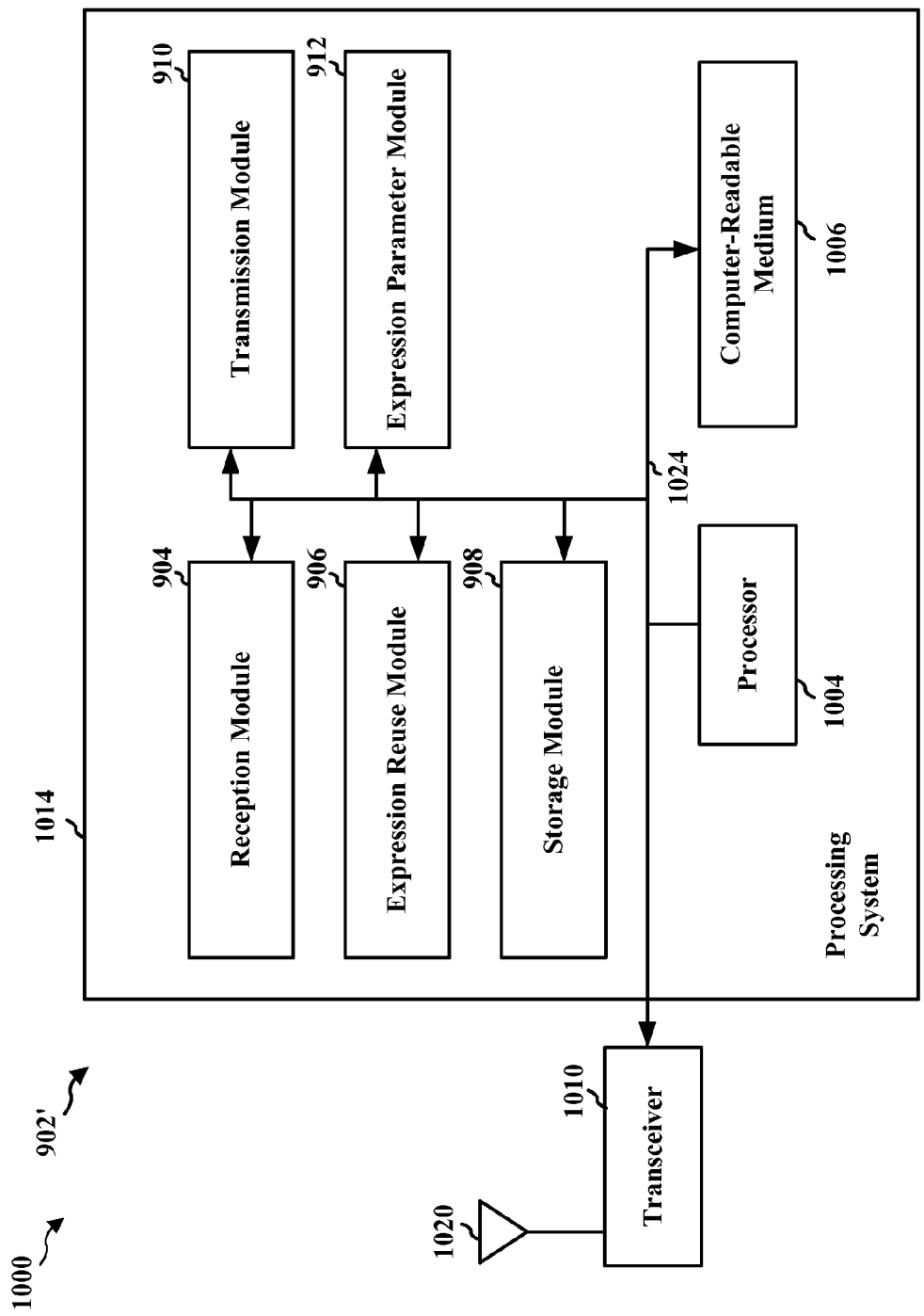
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, and 912. The modules may be software modules running in the processor 1004, resident/stored in the computer readable medium 1006, one or more hardware modules coupled to the processor 1004, or some combination thereof. The processing system 1014 may be a component of the WAN entity 610 (e.g., MME) and may include the memory 676 and/or at least one of the TX processor 616, the RX processor 670, and the controller/processor 675.

In one configuration, the apparatus 902/902' for wireless communication includes means for receiving, by a MME, a request from a first UE to establish a communication link with a second UE based on a first expression pair, means for determining whether the first UE and the second UE can use a first context associated with a previously established communication link based on a previously used expression pair, and means for providing at least a portion of information associated with the first context to the first UE upon a determination that the first UE and the second UE have the first context. The apparatus 902/902' may further include means for generating a second context for the communication link based on the first expression pair upon a determination that the first UE and the second UE do not have the first context, means for providing at least a portion of information associated with the second context to the first UE to establish the communication link based on the first expression pair, and means for storing at least a portion of the second context. In another aspect, the apparatus 902/902' may further include means for receiving connection information from the second UE including at least one of an expression associated with the second UE or a context established with one or more other UEs, and means for storing at least a portion of the received connection information. In such an aspect, the apparatus 902/902' may further include means for indexing the context based on an identifier associated with each of the one or more other UEs. In another aspect, the apparatus 902/902' means for applying a time to live (TTL) value to at least one value included in the received connection information, and means for removing the connection information upon expiration of the TTL value. In such an aspect, the apparatus 902/902' means for determining may be configured to search one or more contexts associated with the first UE for a context that references an expression associated with the second UE. In another aspect, the apparatus 902/902' may further include means for receiving a request from the second UE for at least one value included in the connection information, and means for providing the requested at least one value to the second UE. In another aspect, the apparatus 902/902' may further include means for determining that the second UE is to be served by a second MME, and means for providing at least a portion of the connection information to the second MME. In another aspect, the apparatus 902/902' means for providing may be configured to send at least a portion of one or more parameters associated with the second UE expression to a first UE. In such an aspect, the apparatus 902/902' means for determining may be configured to determine whether the second UE is discoverable by the first UE and is configured to establish the communication link based on the one or more parameters. In such an aspect, the UE may be configured to establish the communication link when the UE is able to establish the communication link and is allowed to establish the communication link (e.g., based on parameter values).

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 616, the RX Processor 670, and the controller/processor 675. As such, in one configuration, the aforementioned means may be the TX Processor 616, the RX Processor 670, and/or the controller/processor 675 configured to perform the functions recited by the aforementioned means.

FIG. 11 is a flow chart 1100 of a second method of wireless communication. The method may be performed by a UE.

At block 1102, the UE may send a connection request, to a MME, to establish a communication link with a second UE based on a first expression pair. In one aspect, the first expression pair may be associated with a service layer.

At block 1104, the UE may receive at least a portion of information associated with a first context between the first UE and the second UE based on a previously established communication link with a previously used expression pair. In an aspect, the first context may be associated with a link layer. In another aspect, multiple expressions associated with the first UE may be associated with the first context used by the UEs. In another aspect, the first context may include information to facilitate communications between the UEs. For example, the context may include cryptographic material, a QoS parameter, or link configuration parameters, etc. In another aspect, the information may include at least a portion of the parameters associated with expressions.

At block 1106, the UE may establish the communication link with the second UE using the received at least a portion of the information.

In an optional aspect, at block 1108, the UE may send connection information to the MME for storage including at least one of an expression associated with the first UE or a context established with one or more other UEs. In such an optional aspect, at block 1110, the UE may subsequently send a request to the MME for value(s) included in the previously sent connection information. In response to the request, the information received at block 1104 may further include the requested value(s).

In another optional aspect, the UE may send parameters associated with expressions for storage by an MME. Examples of parameters are provided with reference to Table 1.

Figure 12:
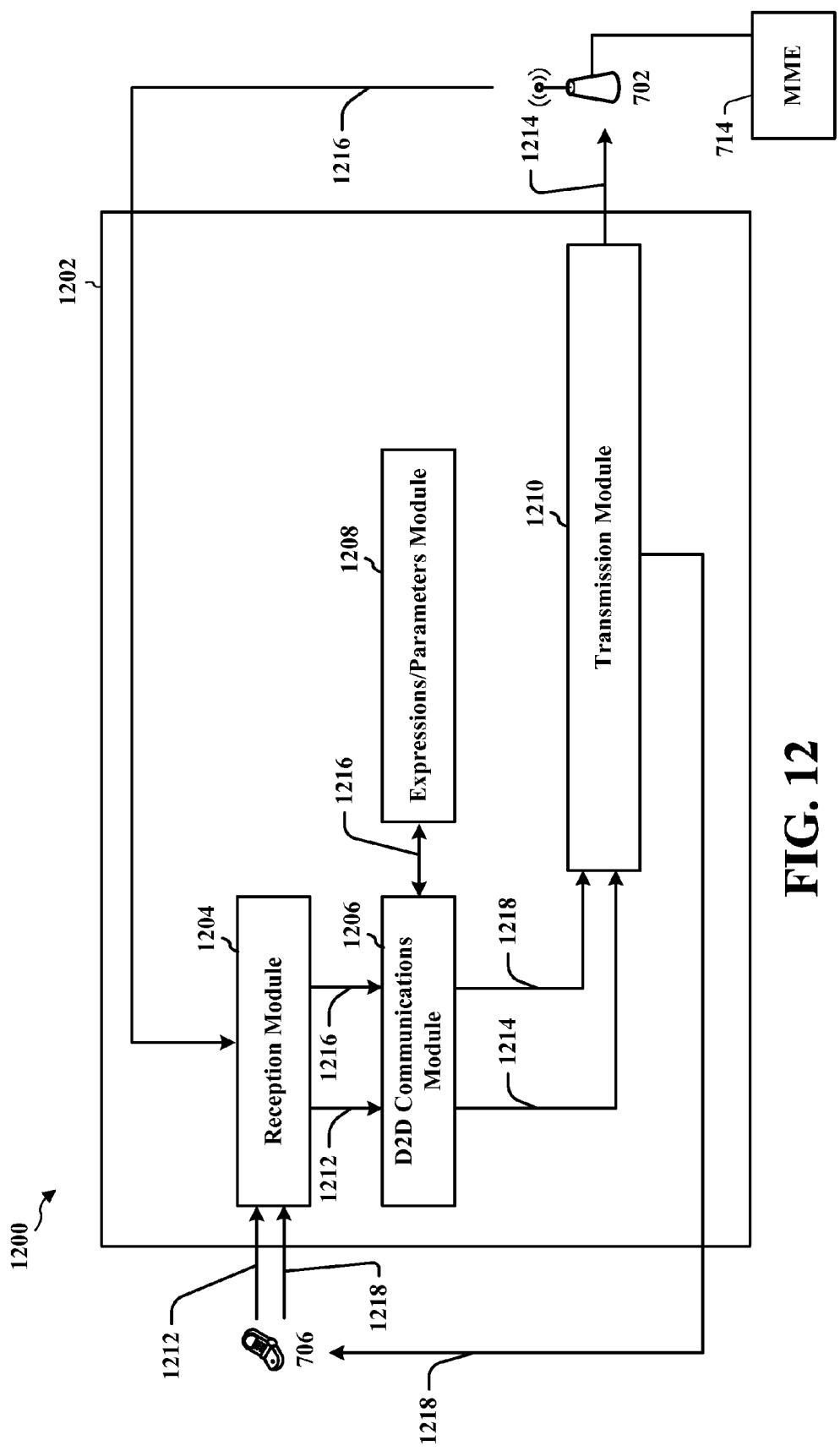
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus 1202 includes a transmission module 1210 that may transmit a connection message 1214 to an eNodeB 702 to be sent to MME 714. In an aspect, the connection message 1216 may include a connection request to establish a communication link with a second UE 706 based on a first expression pair 1212. In an aspect, the first expression pairing 1212 may be determined between apparatus 1202 and UE 706. The apparatus 1202 further includes a reception module 1204 that may receive a message 1216 includes at least a portion of information associated with a first context between the apparatus 1202 and the second UE 706 based on a previously established communication link with a previously used expression pair. In an aspect, the first context may be associated with a link layer. In another aspect, multiple expressions associated with the first UE may be associated with the first context used by the UEs. In another aspect, the first context may include information to facilitate communications between the UEs. For example, the context may include cryptographic material, a QoS parameter, or link configuration parameters, etc. In another aspect, the information may include at least a portion of the parameters associated with expressions. Additionally, apparatus 1202 includes D2D communications module 1206 that provides support for D2D communications 1218 through transmission module 1210 based in part on the received previously established context 1216. Apparatus 1202 includes expression/parameter module 1208 that may storage various expressions associated with apparatus 1202. In an optional aspect, expression/parameter module 1208 may further store parameters associated with the stored expressions.

The apparatus may include additional modules that perform each of the steps of the algorithm in the aforementioned flow charts of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
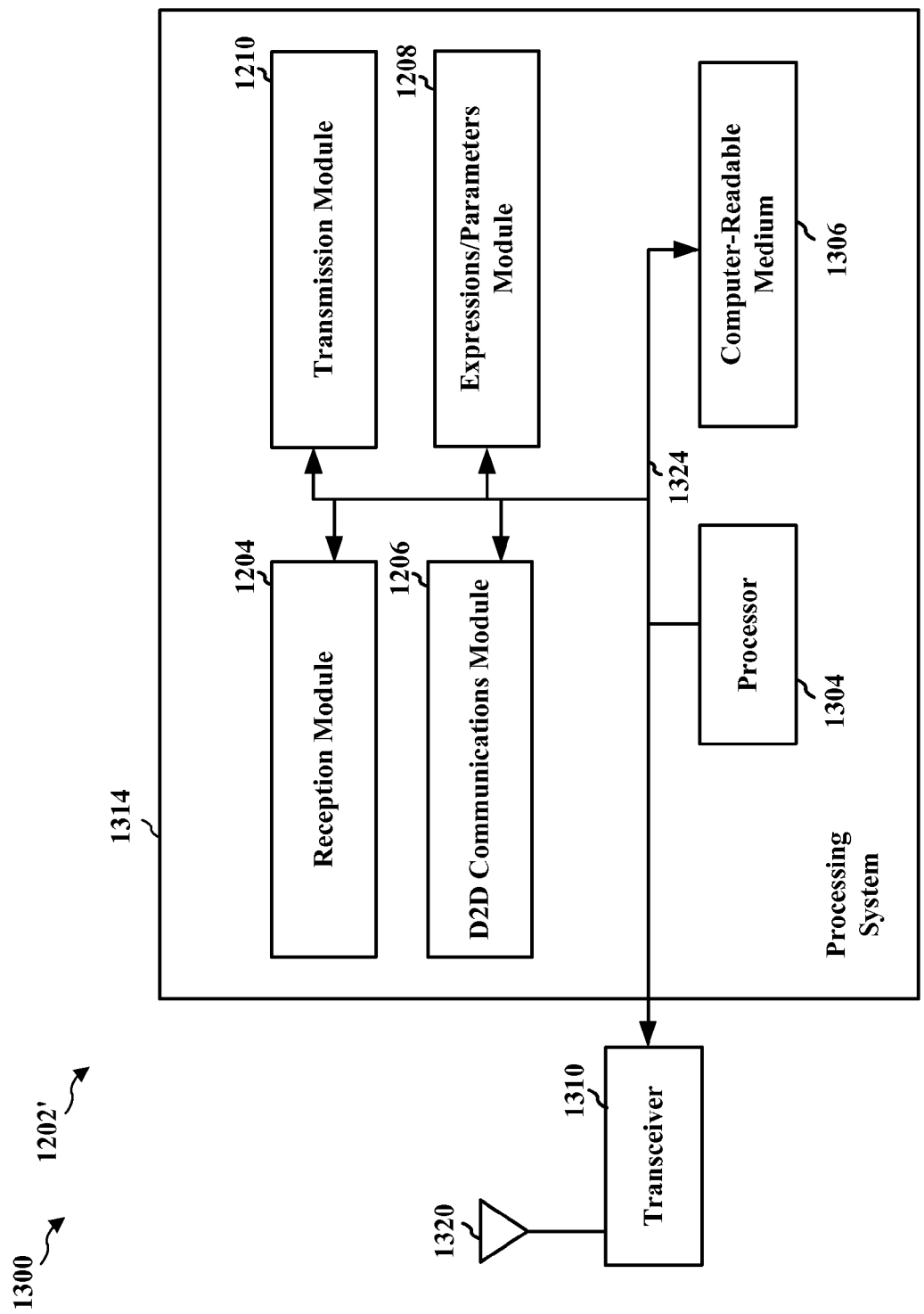
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for sending a connection request, to a MME, to establish a communication link between a first UE and a second UE based on a first expression pair, means for receiving at least a portion of information associated with a first context between the first UE and the second UE based on a previously established communication link with a previously used expression pair, and means for establishing, by the first UE, the communication link with the second UE using the received at least a portion of the information. In another aspect, the apparatus 1202/1202' means for sending connection information to the MME for storage including at least one of an expression associated with the first UE or a context established with one or more other UEs. In another aspect, the apparatus 1202/1202' means for sending a request to the MME for at least one value included in the sent connection information, and means for receiving the requested at least one value. In another aspect, the apparatus 1202/1202' may include means for sending one or more parameters associated with a first UE expression for the first UE. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
    receiving, by a mobility management entity (MME), a request from a first user equipment (UE) to establish a communication link with a second UE based on a first expression pair;
    determining whether the first UE and the second UE can use a first context associated with a previously established communication link based on a previously used expression pair;
    providing at least a portion of information associated with the first context to the first UE upon a determination that the first UE and the second UE have the first context;
    generating, by the MME, a second context for the communication link based on the first expression pair upon a determination that the first UE and the second UE do not have the first context; and
    providing, by the MME, at least a portion of information associated with the generated second context to the first UE to establish the communication link based on the first expression pair upon the determination that the first UE and the second UE do not have the first context.

2. The method of claim 1, further comprising:
    storing at least a portion of the second context.

3. The method of claim 1, wherein the first expression pair is associated with a service layer, and wherein the first context is associated with a link layer.

4. The method of claim 1, wherein two or more expressions associated with the first UE are associated with the first context used by the first UE and second UE.

5. The method of claim 1, wherein the first context comprises information to facilitate communications between the first UE and the second UE including at least one of: cryptographic material, a quality of service (QoS) parameter, or one or more link configuration parameters.

6. The method of claim 1, further comprising:
    receiving connection information from the second UE including at least one of an expression associated with the second UE or a context established with one or more other UEs; and storing at least a portion of the received connection information.

7. The method of claim 6, wherein the received connection information includes the context established with one or more other UEs, and wherein the storing further comprises:
   indexing the context based on an identifier associated with each of the one or more other UEs.

8. The method of claim 6, wherein the storing further comprises:
   applying a time to live (TTL) value to at least one value included in the received connection information; and
   removing the connection information upon expiration of the TTL value.

9. The method of claim 6, wherein the determining whether the first UE and the second UE have the first context further comprises searching one or more contexts associated with the first UE for a context that references an expression associated with the second UE, wherein the first expression pair includes the expression associated with the second UE.

10. The method of claim 6, further comprising:
    receiving a request from the second UE for at least one value included in the connection information; and
    providing the requested at least one value to the second UE.

11. The method of claim 6, further comprising:
    determining that the second UE is to be served by a second MME; and
    providing at least a portion of the connection information to the second MME.

12. The method of claim 6, wherein the connection information further comprises one or more parameters associated with a second UE expression for the second UE.

13. The method of claim 12, wherein the providing further comprises:
    sending, to the first UE, at least a portion of the one or more parameters associated with the second UE expression.

14. The method of claim 12, wherein the determining whether the first UE and the second UE can use the first context further comprises:
    determining whether the second UE is discoverable by the first UE and is configured to establish the communication link based on the one or more parameters.

15. The method of claim 12, wherein the one or more parameters comprises at least one of:
    a range of announcement for the second UE expression;
    a type of authentication provided for the second UE expression;
    a type of link security provided for a link associated with the second UE expression;
    at least one of a UE or subscriber identifier associated with the second UE expression; or
    a periodicity of announcement of the second UE expression.

16. A method of wireless communications, comprising:
    sending a connection request, to a mobility management entity (MME), to establish a communication link between a first user equipment (UE) and a second UE based on a first expression pair;
    receiving at least a portion of information associated with a first context between the first UE and the second UE based on a previously established communication link with a previously used expression pair if the first UE and the second UE have the first context;
    receiving, from the MME, at least a portion of information associated with a generated second context if the first UE and the second UE do not have the first context; and
    establishing, by the first UE, the communication link with the second UE using the received at least a portion of the information associated with the first context or the received at least a portion of information associated with the generated second context.

17. The method of claim 16, wherein the first expression pair is associated with a service layer, and wherein the first context is associated with a link layer.

18. The method of claim 16, wherein two or more expressions associated with the first UE are associated with the first context used by the first UE and second UE.

19. The method of claim 16, wherein the first context comprises information to facilitate communications between the first UE and the second UE including at least one of: cryptographic material, a quality of service (QoS) parameter, or one or more link configuration parameters.

20. The method of claim 16, further comprising:
    sending connection information to the MME for storage including at least one of an expression associated with the first UE or a context established with one or more other UEs.

21. The method of claim 20, further comprising:
    sending a request to the MME for at least one value included in the sent connection information; and
    receiving the requested at least one value.

22. The method of claim 16, wherein the at least a portion of the information further includes at least a portion of the one or more parameters associated with a second UE expression.

23. The method of claim 22, wherein the one or more parameters comprises at least one of:
    a range of announcement for the second UE expression;
    a type of authentication provided for the second UE expression;
    a type of link security provided for a link associated with the second UE expression;
    at least one of a UE or subscriber identifier associated with the second UE expression; or
    a periodicity of announcement of the second UE expression.

24. The method of claim 16, further comprising:
    sending one or more parameters associated with a first UE expression for the first UE.

25. An apparatus for wireless communication, comprising:
    means for receiving, by a mobility management entity (MME), a request from a first user equipment (UE) to establish a communication link with a second UE based on a first expression pair;
    means for determining, by the MME, whether the first UE and the second UE can use a first context associated with a previously established communication link based on a previously used expression pair; and
    means for providing, by the MME, at least a portion of information associated with the first context to the first UE upon a determination that the first UE and the second UE have the first context,
    wherein the means for determining is further configured to generate a second context for the communication link based on the first expression pair upon a determination that the first UE and the second UE do not have the first context, and
    wherein the means for providing is further configured to provide at least a portion of information associated with the generated second context to the first UE to establish the communication link based on the first expression pair upon the determination that the first UE and the second UE do not have the first context.

26. The apparatus of claim 25, wherein the means for determining is further configured to:
    store at least a portion of the second context.

27. The apparatus of claim 25, wherein the first expression pair is associated with a service layer, and wherein the first context is associated with a link layer.

28. The apparatus of claim 25, wherein two or more expressions associated with the first UE are associated with the first context used by the first UE and second UE.

29. The apparatus of claim 25, wherein the first context comprises information to facilitate communications between the first UE and the second UE including at least one of: cryptographic material, a quality of service (QoS) parameter, or one or more link configuration parameters.

30. The apparatus of claim 25, wherein the means for receiving is further configured to receive connection information from the second UE including at least one of an expression associated with the second UE or a context established with one or more other UEs; and
   means for storing at least a portion of the received connection information.

31. The apparatus of claim 30, wherein the received connection information includes the context established with one or more other UEs, and wherein the means for storing is further configured to index the context based on an identifier associated with each of the one or more other UEs.

32. The apparatus of claim 30, wherein the means for storing is further configured to:
   apply a time to live (TTL) value to at least one value included in the received connection information; and
   remove the connection information upon expiration of the TTL value.

33. The apparatus of claim 30, wherein the means for determining whether the first UE and the second UE have the first context is further configured to search one or more contexts associated with the first UE for a context that references an expression associated with the second UE, wherein the first expression pair includes the expression associated with the second UE.

34. The apparatus of claim 30, wherein the means for receiving is further configured to receive a request from the second UE for at least one value included in the connection information; and
   wherein the means for providing is further configured to provide the requested at least one value to the second UE.

35. The apparatus of claim 30, wherein the means for determining is further configured to determine that the second UE is to be served by a second MME; and
   wherein the means for providing is further configured to provide at least a portion of the connection information to the second MME.

36. The apparatus of claim 30, wherein the connection information further comprises one or more parameters associated with a second UE expression for the second UE.

37. The apparatus of claim 36, wherein the means for providing is further configured to send, to the first UE, at least a portion of the one or more parameters associated with the second UE expression.

38. The apparatus of claim 36, wherein the means for determining whether the first UE and the second UE can use the first context is further configured to determine whether the second UE is discoverable by the first UE and is configured to establish the communication link based on the one or more parameters.

39. The apparatus of claim 36, wherein the one or more parameters comprises at least one of:
   a range of announcement for the second UE expression;
   a type of authentication provided for the second UE expression;
   a type of link security provided for a link associated with the second UE expression;
   at least one of a UE or subscriber identifier associated with the second UE expression; or
   a periodicity of announcement of the second UE expression.

40. An apparatus for wireless communications, comprising:
   means for sending a connection request, to a mobility management entity (MME), to establish a communication link between a first user equipment (UE) and a second UE based on a first expression pair;
   means for receiving at least a portion of information associated with a first context between the first UE and the second UE based on a previously established communication link with a previously used expression pair if the first UE and the second UE have the first context, and receiving, from the MME, at least a portion of information associated with a generated second context if the first UE and the second UE do not have the first context; and
   means for establishing, by the first UE, the communication link with the second UE using the received at least a portion of the information associated with the first context or the received at least a portion of information associated with the generated second context.

41. The apparatus of claim 40, wherein the first expression pair is associated with a service layer, and wherein the first context is associated with a link layer.

42. The apparatus of claim 40, wherein two or more expressions associated with the first UE are associated with the first context used by the first UE and second UE.

43. The apparatus of claim 40, wherein the first context comprises information to facilitate communications between the first UE and the second UE including at least one of: cryptographic material, a quality of service (QoS) parameter, or one or more link configuration parameters.

44. The apparatus of claim 40, wherein the means for sending is further configured to send connection information to the MME for storage including at least one of an expression associated with the first UE or a context established with one or more other UEs.

45. The apparatus of claim 44, wherein the means for sending is further configured to send a request to the MME for at least one value included in the sent connection information; and
   wherein the means for receiving is further configured to receive the requested at least one value.

46. The apparatus of claim 40, wherein the at least a portion of the information further includes at least a portion of the one or more parameters associated with a second UE expression.

47. The apparatus of claim 46, wherein the one or more parameters comprises at least one of:
   a range of announcement for the second UE expression;
   a type of authentication provided for the second UE expression;
   a type of link security provided for a link associated with the second UE expression;
   at least one of a UE or subscriber identifier associated with the second UE expression; or
   a periodicity of announcement of the second UE expression.

48. The apparatus of claim 40, wherein the means for sending is further configured to send one or more parameters associated with a first UE expression for the first UE.

49. An apparatus for wireless communication, comprising: a processing system configured to:
 receive, by a mobility management entity (MME), a request from a first user equipment (UE) to establish a communication link with a second UE based on a first expression pair;
 determine whether the first UE and the second UE can use a first context associated with a previously established communication link based on a previously used expression pair;
 provide at least a portion of information associated with the first context to the first UE upon a determination that the first UE and the second UE have the first context;
 generate, by the MME, a second context for the communication link based on the first expression pair upon a determination that the first UE and the second UE do not have the first context; and
 provide, by the MME, at least a portion of information associated with the generated second context to the first UE to establish the communication link based on the first expression pair upon the determination that the first UE and the second UE do not have the first context.

50. The apparatus of claim 49, wherein the processing system is further configured to:
 store at least a portion of the second context.

51. The apparatus of claim 49, wherein the first expression pair is associated with a service layer, and wherein the first context is associated with a link layer.

52. The apparatus of claim 49, wherein two or more expressions associated with the first UE are associated with the first context used by the first UE and second UE.

53. The apparatus of claim 49, wherein the first context comprises information to facilitate communications between the first UE and the second UE including at least one of: cryptographic material, a quality of service (QoS) parameter, or one or more link configuration parameters.

54. The apparatus of claim 49, wherein the processing system is further configured to:
 receive connection information from the second UE including at least one of an expression associated with the second UE or a context established with one or more other UEs; and
 store at least a portion of the received connection information.

55. The apparatus of claim 54, wherein the received connection information includes the context established with one or more other UEs, and wherein the processing system is further configured to:
 index the context based on an identifier associated with each of the one or more other UEs.

56. The apparatus of claim 54, wherein the processing system is further configured to:
 apply a time to live (TTL) value to at least one value included in the received connection information; and
 remove the connection information upon expiration of the TTL value.

57. The apparatus of claim 54, wherein the processing system is further configured to search one or more contexts associated with the first UE for a context that references an expression associated with the second UE, wherein the first expression pair includes the expression associated with the second UE.

58. The apparatus of claim 54, wherein the processing system is further configured to:
 receive a request from the second UE for at least one value included in the connection information; and
 provide the requested at least one value to the second UE.

59. The apparatus of claim 54, wherein the processing system is further configured to:
 determine that the second UE is to be served by a second MME; and
 provide at least a portion of the connection information to the second MME.

60. The apparatus of claim 54, wherein the connection information further comprises one or more parameters associated with a second UE expression for the second UE.

61. The apparatus of claim 60, wherein the processing system is further configured to:
 send, to the first UE, at least a portion of the one or more parameters associated with the second UE expression.

62. The apparatus of claim 60, wherein the processing system is further configured to determine whether the second UE is discoverable by the first UE and is configured to establish the communication link based on the one or more parameters.

63. The apparatus of claim 60, wherein the one or more parameters comprises at least one of:
 a range of announcement for the second UE expression;
 a type of authentication provided for the second UE expression;
 a type of link security provided for a link associated with the second UE expression;
 at least one of a UE or subscriber identifier associated with the second UE expression; or
 a periodicity of announcement of the second UE expression.

64. An apparatus for wireless communication, comprising: a processing system configured to:
 send a connection request, to a mobility management entity (MME), to establish a communication link between a first user equipment (UE) and a second UE based on a first expression pair;
 receive at least a portion of information associated with a first context between the first UE and the second UE based on a previously established communication link with a previously used expression pair if the first UE and the second UE have the first context;
 receive, from the MME, at least a portion of information associated with a generated second context if the first UE and the second UE do not have the first context; and
 establish, by the first UE, the communication link with the second UE using the received at least a portion of the information associated with the first context or the received at least a portion of the information associated with the generated second context.

65. The apparatus of claim 64, wherein the first expression pair is associated with a service layer, and wherein the first context is associated with a link layer.

66. The apparatus of claim 64, wherein two or more expressions associated with the first UE are associated with the first context used by the first UE and second UE.

67. The apparatus of claim 64, wherein the first context comprises information to facilitate communications between the first UE and the second UE including at least one of: cryptographic material, a quality of service (QoS) parameter, or one or more link configuration parameters.

68. The apparatus of claim 64, wherein the processing system is further configured to:

send connection information to the MME for storage including at least one of an expression associated with the first UE or a context established with one or more other UEs.

69. The apparatus of claim 68, wherein the processing system is further configured to:
send a request to the MME for at least one value included in the sent connection information; and
receive the requested at least one value.

70. The apparatus of claim 64, wherein the at least a portion of the information further includes at least a portion of the one or more parameters associated with a second UE expression.

71. The apparatus of claim 70, wherein the one or more parameters comprises at least one of:
a range of announcement for the second UE expression;
a type of authentication provided for the second UE expression;
a type of link security provided for a link associated with the second UE expression;
at least one of a UE or subscriber identifier associated with the second UE expression; or
a periodicity of announcement of the second UE expression.

72. The apparatus of claim 64, wherein the processing system is further configured to:
send one or more parameters associated with a first UE expression for the first UE.

73. A
a non-transitory computer-readable medium storing computer executable code for wireless communication, comprising code for:
receiving, by a mobility management entity (MME), a request from a first user equipment (UE) to establish a communication link with a second UE based on a first expression pair;
determining whether the first UE and the second UE can use a first context associated with a previously established communication link based on a previously used expression pair; and
providing at least a portion of information associated with the first context to the first UE upon a determination that the first UE and the second UE have the first context;
generating, by the MME, a second context for the communication link based on the first expression pair upon a determination that the first UE and the second UE do not have the first context;
providing, by the MME, at least a portion of information associated with the generated second context to the first UE to establish the communication link based on the first expression pair upon the determination that the first UE and the second UE do not have the first context.

74. The non-transitory computer-readable medium of claim 73, further comprising code for:
storing at least a portion of the second context.

75. The non-transitory computer-readable medium of claim 73, wherein the first expression pair is associated with a service layer, and wherein the first context is associated with a link layer.

76. The non-transitory computer-readable medium of claim 73, wherein two or more expressions associated with the first UE are associated with the first context used by the first UE and second UE.

77. The non-transitory computer-readable medium of claim 73, wherein the first context comprises information to facilitate communications between the first UE and the second UE including at least one of: cryptographic material, a quality of service (QoS) parameter, or one or more link configuration parameters.

78. The non-transitory computer-readable medium of claim 73, further comprising code for:
receiving connection information from the second UE including at least one of an expression associated with the second UE or a context established with one or more other UEs; and
storing at least a portion of the received connection information.

79. The non-transitory computer-readable medium of claim 78, wherein the received connection information includes the context established with one or more other UEs, and wherein the computer-readable medium further comprises code for:
indexing the context based on an identifier associated with each of the one or more other UEs.

80. The non-transitory computer-readable medium of claim 78, further comprising code for:
applying a time to live (TTL) value to at least one value included in the received connection information; and
removing the connection information upon expiration of the TTL value.

81. The non-transitory computer-readable medium of claim 78, further comprising code for searching one or more contexts associated with the first UE for a context that references an expression associated with the second UE, wherein the first expression pair includes the expression associated with the second UE.

82. The non-transitory computer-readable medium of claim 78, further comprising code for:
receiving a request from the second UE for at least one value included in the connection information; and
providing the requested at least one value to the second UE.

83. The non-transitory computer-readable medium of claim 78, further comprising code for:
determining that the second UE is to be served by a second MME; and
providing at least a portion of the connection information to the second MME.

84. The non-transitory computer-readable medium of claim 78, wherein the connection information further comprises one or more parameters associated with a second UE expression for the second UE.

85. The non-transitory computer-readable medium of claim 84, further comprising code for:
sending, to the first UE, at least a portion of the one or more parameters associated with the second UE expression.

86. The non-transitory computer-readable medium of claim 84, further comprising code for:
determining whether the second UE is discoverable by the first UE and is configured to establish the communication link based on the one or more parameters.

87. The non-transitory computer-readable medium of claim 84, wherein the one or more parameters comprises at least one of:
a range of announcement for the second UE expression;
a type of authentication provided for the second UE expression;
a type of link security provided for a link associated with the second UE expression;
at least one of a UE or subscriber identifier associated with the second UE expression; or
a periodicity of announcement of the second UE expression.

88. A non-transitory computer-readable medium storing computer executable code, comprising code for:
- sending a connection request, to a mobility management entity (MME), to establish a communication link between a first user equipment (UE) and a second UE based on a first expression pair;
- receiving at least a portion of information associated with a first context between the first UE and the second UE based on a previously established communication link with a previously used expression pair if the first UE and the second UE have the first context;
- receiving, from the MME, at least a portion of information associated with a generated second context if the first UE and the second UE do not have the first context; and
- establishing, by the first UE, the communication link with the second UE using the received at least a portion of the information associated with the first context or the received at least a portion of the information associated with the generated second context.

89. The non-transitory computer-readable medium of claim 88, wherein the first expression pair is associated with a service layer, and wherein the first context is associated with a link layer.

90. The non-transitory computer-readable medium of claim 88, wherein two or more expressions associated with the first UE are associated with the first context used by the first UE and second UE.

91. The non-transitory computer-readable medium of claim 88, wherein the first context comprises information to facilitate communications between the first UE and the second UE including at least one of: cryptographic material, a quality of service (QoS) parameter, or one or more link configuration parameters.

92. The non-transitory computer-readable medium of claim 88, further comprising code for:
- sending connection information to the MME for storage including at least one of an expression associated with the first UE or a context established with one or more other UEs.

93. The non-transitory computer-readable medium of claim 92, further comprising code for:
- sending a request to the MME for at least one value included in the sent connection information; and
- receiving the requested at least one value.

94. The non-transitory computer-readable medium of claim 88, wherein the at least a portion of the information further includes at least a portion of the one or more parameters associated with a second UE expression.

95. The non-transitory computer-readable medium of claim 94, wherein the one or more parameters comprises at least one of:
- a range of announcement for the second UE expression;
- a type of authentication provided for the second UE expression;
- a type of link security provided for a link associated with the second UE expression;
- at least one of a UE or subscriber identifier associated with the second UE expression; or
- a periodicity of announcement of the second UE expression.

96. The non-transitory computer-readable medium of claim 88, further comprising code for:
- sending one or more parameters associated with a first UE expression for the first UE.

* * * * *